United States Patent

[11] 3,583,629

[72] Inventor Henry Heidel
 Flint, Mich.
[21] Appl. No. 879,264
[22] Filed Nov. 24, 1969
[45] Patented June 8, 1971
[73] Assignee General Motors Corporation
 Detroit, Mich.

[54] TELLTALE ODOMETER
 2 Claims, 4 Drawing Figs.
[52] U.S. Cl. ................................................ 235/96,
 116/115
[51] Int. Cl. ................................................ G01c 22/00
[50] Field of Search .......................................... 235/95, 96,
 117, 117.1; 116/115, 114 W

[56] References Cited
 UNITED STATES PATENTS
1,531,774 3/1925 Whittington ................. 116/115
1,610,639 12/1926 Whittington ................. 116/114
1,708,708 4/1929 Tibbetts ....................... 235/117X Primary Examiner—Richard B. Wilkinson
Assistant Examiner—Stanley A. Wal
Attorneys—Sidney Carter and Peter A. Taucher ABSTRACT: The invention relates to automobile odometers and, more particularly, to odometers which are generally mounted in or adjacent to the automobile speedometer in the instrument panel, and having an indicator associated therewith that is readily visible to the viewer through a window or opening in the automobile instrument panel. An indication will be conveyed to a viewer that the numbered wheels of the odometer have each in sequence turned at least one complete revolution. More specifically, the odometer includes an additional wheel adjacent the highest numbered indicating wheel and marked in a manner to readily show that the numbered wheels on the odometer have turned one complete revolution.

PATENTED JUN 8 1971

3,583,629

INVENTOR.
Henry Heidel
BY
P.A. Jaucher
ATTORNEY

TELLTALE ODOMETER

Automobile odometers presently in use do not have an indicating member to show that the highest-order number wheel has made at least one complete revolution. Therefore, it has been easy for anyone desirous of tampering with an odometer to turn the odometer through and past the highest-order number wheel reading to recycle the odometer to a zero reading. Without some way of knowing that the odometer has passed through the highest order of digits or highest reading for which it was designed, the viewer would not be aware of the actual number of miles driven. With the present invention, the odometer would readily indicate, and it would be apparent to the viewer, that the odometer had turned through the highest possible reading, which in most cases is 100,000 miles, as well as the number of times it has done so.

This invention is assembled on an odometer to function with an antireverse device shown in application Ser. No. 749,798 now U.S. Pat. No. 3,516,603 and an antipick device, shown in application Ser. No. 776,371, now U.S. Pat. No. 3,482,773. The antireverse device prevents the odometer from being reversed by driving the odometer in a reverse direction by means of a high-speed motor or the like to indicate a different mileage reading than that actually driven. The antipick device provides an indication that the numbered wheels on the odometer had been moved by means of lock picks, etc., inserted through the odometer case. It is understood that the antipick feature will be assembled and used on the telltale wheel to prevent picking and reversal of the wheel.

With the above two devices installed on an odometer, the only direction in which it is possible to change the odometer readings or effectively tamper with the odometer would be in the forward direction. The present invention, when installed on an odometer, should effectively preclude turning the odometer in the forward direction to change odometer mileage readings because it will provide an indication to the viewer that the odometer has gone through its maximum reading for which it was designed and how many times, to therefore indicate actual mileage driven.

Figure 1:
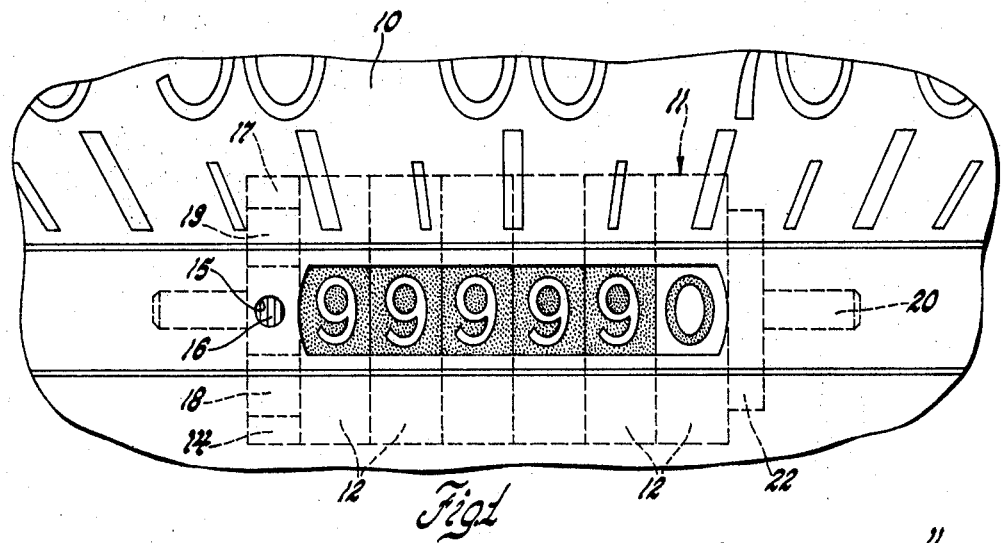
FIG. 1 shows an odometer mounted in an instrument panel with the indicator showing less than the maximum reading.

In FIG. 1 there is shown a cutaway section of a speedometer 10 which is normally mounted in the instrument panel of an automobile and generally has an associated odometer 11 mounted below or adjacent thereto. The mounting of the speedometer and odometer are well known in the art, as shown in U.S. Pat. No. 2,759,447 to Helgeby. Odometer 11 includes a plurality of numbered wheels 12 mounted on a shaft 20 with the odometer wheels being driven in the conventional manner by drive gear 22 through pinion gears as shown in U.S. Pat. No. 3,137,444 to Harada.

A complementary cylindrical wheel, more generally noted or described as a telltale wheel 14, is coaxially mounted on shaft 20 adjacent to and on the outward side of the numbered wheel of the highest-order digit. Telltale wheel 14 is driven through a pinion gear by the highest-order number wheel in the same manner as each of the respective numbered wheels. There is a viewing window or similar arrangement as shown at 15 in the instrument panel, or the odometer mounting itself, where the viewer or driver of the automobile can readily note any color change that occurs in the window because of the movement of the complementary cylindrical wheel or telltale wheel. The color of the telltale wheel may initially be of any color 16 such as red, green, or the like, and when the telltale wheel is rotated from its initial color as viewed in window 15 a second different color will appear in the window and become visible to the viewer.

Figure 2:
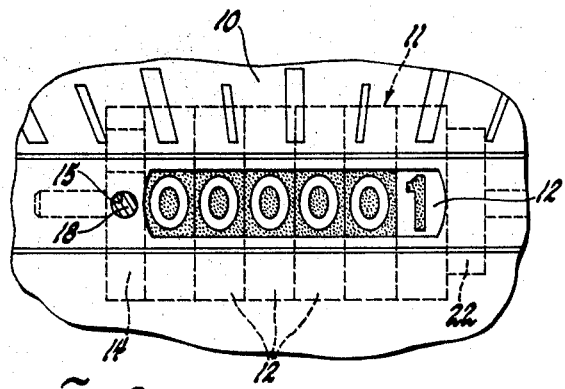
FIG. 2 is a similar view to that shown in FIG. 1 with the odometer showing the start of a second sequence and the indicator showing that the odometer has been turned past the maximum reading.

As shown in FIG. 2, the numbered wheels on the odometer and, specifically, the highest-order numbered wheel, has made one complete revolution and the odometer has, therefore, turned through 100,000 miles, the maximum mileage for which it was designed. It is understood that a higher total mileage reading could be obtained by the addition of more numbered wheels. As shown at 18, a different color than that shown at 16 in FIG. 1 is visible in the indicating window, giving an indication or telltale signal to the viewer that all the numbered wheels on the odometer have made at least one complete revolution and, therefore, the automobile has traveled a distance greater than 100,000 miles.

Figure 3:
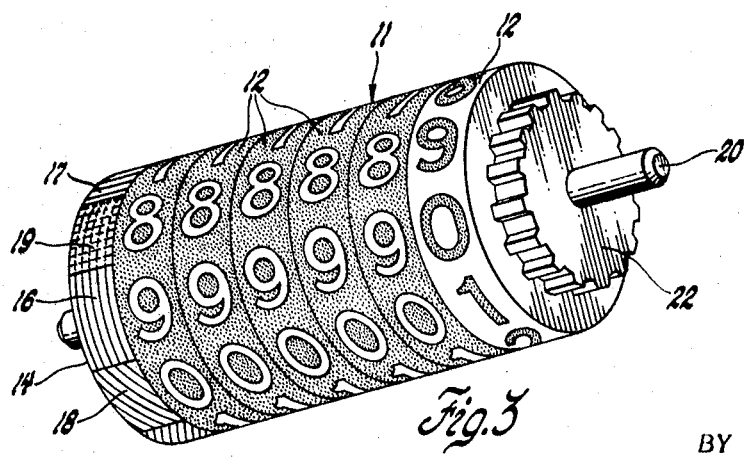
FIG. 3 shows the odometer assembly with the telltale indicating wheel having a plurality of different color areas thereon.

FIG. 3 more clearly shows the complementary telltale wheel adjacent the highest-order numbered wheel and having thereon several different possible color sections or color schemes as, for example, those illustrated at 16, 17, 18, and 19 thereon.

Color sections or schemes as shown at 16, 17, 18, and 19 may be used on the telltale wheel in an alternate arrangement wherein a known sequence color code would indicate to the viewer the number of times up to ten that the odometer has gone through its maximum reading. As an example, the initial color may be red, the next color green, the third color red stripes, etc., which would indicate one, two, three or more complete revolutions of the odometer up to 10 before the sequence starts again. After the odometer has gone through the maximum reading ten times, the sequence will start over again. By this time the odometer or the vehicle will have outlived its useful life. The different color schemes or arrangements on the telltale wheel should be located and coincide to the distance the wheel is driven by the highest-order number wheel to ensure a color change in the window. The color section appearing in the window at a given time will remain in the viewing window until such time as the highest-order digit adjacent to the telltale wheel makes a complete revolution, after which the next color will be visible in the window.

Figure 4:
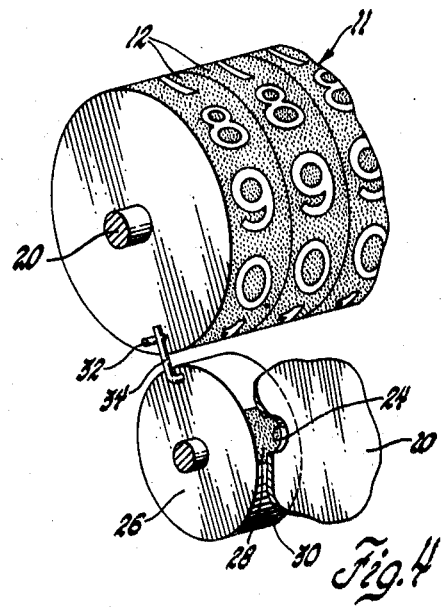
FIG. 4 shows a second embodiment of the invention with the telltale wheel below the odometer.

FIG. 4 shows a modification of the telltale wheel. The highest-order numbered wheel has a drive member 32 in contact with a driven member 34 on the telltale wheel mounted on a separate shaft from that of the numbered wheels. When the highest-ordered numbered wheel makes one complete revolution, which would mean that the odometer has turned 100,000 miles, it will turn the telltale wheel 26, whereby a different color 30 from the color 28 will be viewed in the window 24. Drive member 32 is arranged on the telltale wheel 26 to move the telltale wheel from the unmoved to the moved position through driven member 34 where the second color will thereafter remain in the window. It is further understood that the telltale wheel 26 could be weighted in such a manner so that once moved or rotated, the weight would retain the wheel in the moved position, generally 180° from the initial position, with the driven member 34 positioned out of a driving relationship with drive member 32.

The invention is a novel means of providing odometers, after very slight modification, with the means of indicating the the odometer has turned through 100,000 miles. By use of the invention, it will not be possible to change the mileage through the 100,000 mile reading without indicating to the viewer that this has been done at least one time.

I claim:

1. In combination: an odometer on a vehicle having an array of cylindrical coaxial number wheels interconnected to rotate stepwise in digital counting action and in sequence to indicate numerically the cumulative vehicle travel up to a predetermined total, a window, a movable telltale indicator having a face in registration with said window, said face having one visible surface treatment in an initial unmoved position and a different surface treatment when moved, interengaging drive elements, said interengaging drive elements including a drive arm on the outward side of said highest-order number wheel, and a driven arm on said telltale indicator, wherein the drive arm acts on the driven arm to move the telltale indicator from said initial unmoved position to a different position when the number wheel for the highest order of digits completes a full rotation, the drive elements thereafter disengage to discontinue rotation of the telltale indicator, thereby displaying a different surface treatment from that initially seen through said window to provide an indication that all the number wheels on the odometer had turned through at least one complete revolution.

2. In combination: an odometer on a vehicle having an array of cylindrical coaxial number wheels interconnected to rotate stepwise in digital counting action and in sequence to indicate numerically the cumulative vehicle travel up to a predetermined total, a window, a movable telltale indicator having a face in registration with said window, said face having one visible surface treatment in an initial unmoved position, and a different surface treatment when moved, interengaging drive elements, said interengaging drive elements including a drive arm on the outward side of said highest-order number wheel, and a driven arm on said telltale indicator, said telltale indicator being weighted adjacent the driven arm, wherein said drive arm acts on the driven arm to move the telltale indicator from said initial unmoved position to a different position when the number wheel for the highest order of digits completes a full rotation, as said telltale indicator is moved by the interengaging drive elements out of view of said window, the telltale indicator by action of the weighted portion thereof, will cause the telltale indicator to rotate out of reach of said drive arm, thereby displaying a different surface treatment from that initially seen through said window to provide an indication that all the number wheels on the odometer had turned through at least one complete revolution.